United States Patent [19]

Dighton et al.

[11] Patent Number: 5,037,955
[45] Date of Patent: Aug. 6, 1991

[54] METHOD FOR HEATING A VISCOUS POLYETHYLENE SOLUTION

[75] Inventors: Gaylon L. Dighton; Thomas M. Brookins, both of Baton Rouge, La.

[73] Assignee: The Dow Chemical Company, Midland, Mich.

[21] Appl. No.: 535,004

[22] Filed: Jun. 7, 1990

[51] Int. Cl.$^5$ .......................... C08F 6/00; B01D 3/06
[52] U.S. Cl. .................... 528/501; 528/484; 528/481; 528/503; 159/2.1; 159/26.1; 159/47.1; 165/39; 165/140; 165/145; 165/158
[58] Field of Search ............... 428/501, 484, 481, 503; 159/2.1, 47.1, 26.1; 165/32, 39, 40, 144, 145, 159, 1, 158, 140

[56] References Cited

U.S. PATENT DOCUMENTS

| | | | |
|---|---|---|---|
| 4,126,743 | 11/1978 | Shiomura et al. | 528/501 |
| 4,153,501 | 5/1979 | Fink et al. | 528/501 |
| 4,808,262 | 2/1989 | Aneja et al. | 528/501 |
| 4,906,329 | 3/1990 | Tominari et al. | 528/501 |
| 4,942,223 | 7/1990 | Takao et al. | 528/501 |

FOREIGN PATENT DOCUMENTS

| | | | |
|---|---|---|---|
| 649269 | 9/1962 | Canada | 528/501 |
| 2256778 | 8/1975 | France | 165/39 |

*Primary Examiner*—John Ford

[57] ABSTRACT

The invention disclosed herein is a single-pass, horizontal heat exchanger, of the shell and tube type, which is designed for preheating of a viscous material, such as the reactor effluent of a polyethylene solution. The heat exchanger is made in three sections, each of which can be heated independently with a heating fluid, so that a temperature profile can be easily maintained along the entire length of the exchanger. Also, each section can be removed from the exchanger unit independently of the other sections, for cleaning, if the section becomes plugged.

4 Claims, 3 Drawing Sheets

METHOD FOR HEATING A VISCOUS POLYETHYLENE SOLUTION

BACKGROUND OF THE INVENTION

The invention relates to a heat exchanger and a method for heating a viscous material in the exchanger. In particular, the heat exchanger is a single pass, horizontal unit made up in several sections which can be heated independently of each other. DOWLEX® polyethylene resins are linear low density compounds that are widely used today in the plastics industry. In the solution processs for making this product, the reactor effluent consists of the unreacted monomer, co-monomer, polymer, a catalyst, and a hydrocarbon solvent. After reaction, the next step in the process is to preheat the polymer solution to a temperature high enough to vaporize the solvent, the unreacted monomer and co-monomer when the polymer solution is passed into a first stage devolatilizer vessel at lower pressure. This step separates and concentrates the molten polymer phase from the hydrocarbon solvent, unreacted monomer, and co-monomer.

Over a period of several years, different types of heat exchangers have been used for the preheating step. But most exchangers haven't been satisfactory for this operation, because of the characteristics of the stream being heated. The shell and tube type heat exchangers are most commonly used for this purpose, but they have certain problems. For example, in the vertical, multi-pass exchangers the solution flows unevenly through the tubes, because the solvent and unreacted monomer/co-monomer tend to separate from the polymer phase inside the tubes. Bottom heads of these exchangers also become plugged with the viscous polymer solution when it separates from the solvent. The horizontal, multi-pass units also present certain problems, such as plugging of the lower tubes with catalyst residue.

Another type of exchanger that has been used is a single pass unit. One of the problems with this type of exchanger is that the solvent may "cook" out of the polymer solution in some tubes, because of different flow rates and lack of controlled, gradiated heat input along the length of the exchanger tubes. The polymer phase then cross-links and becomes a very high molecular weight material. To keep the pressure drop through the exchanger at a usable level, while maintaining adequate tube surface area for heating the polymer solution, the exchanger must be larger in diameter and shorter in length. The larger diameter of such an exchanger makes it more difficult to seal the heads. Still another problem is created when the tubes become fouled—the only practical way to clean the tubes is to shut the process train down completely, remove the exchanger, and put it in an oven to bake out the hardened material in the tubes.

SUMMARY OF THE INVENTION

The invention is directed to a method for heating a viscous material in a heat exchanger, and controlling the temperature of the material as it moves through the exchanger. In one embodiment of the invention, the exchanger is a single-pass, shell and tube, horizontal unit comprising an inlet section, a central section, and an outlet section. Each section has a tube bundle enclosed within a shell member, and means are installed in each section for directing a heating fluid into and out of each of these sections. The inlet section includes an inlet head member psitioned ahead of the entry end of the tube bundle, and this section is joined to the central section, with a first chamber being defined between these sections.

The central section is joined to the outlet section, and a second chamber is defined between these sections. The outlet section also includes an outlet head member, which is positioned behind the exit end of the tube bundle. A means for measuring temperature and presure inside the heat exchanger is installed in the first and second chambers and in the outlet head member. The temperature/pressure measuring means are each connected into a control system adapted for regulating the temperature of the polymeric material as it moves through each section of the heat exchanger.

In a typical operation of the present heat exchanger, it can be used to heat the reactor effluent of a polyethylene (PE) solution. The PE solution is directed into the inlet head member and moved through the tube bundle of the inlet section at a pressure sufficient to keep the solution from vaporizing. At the same time, a heating fluid is passed through the shell member of this section to heat the solution to a temperature sufficient to vaporize unreacted monomer and a carrier solvent in the solution when the pressure is lowered. As the solution moves on through the central section and the outlet section, it is further heated by passing a heating fluid through each section. The temperature and pressure of the solution is measured as it moves through the first and second chambers and the outlet head member, and the temperature is maintained at a desired level by the control means.

DESCRIPTION OF THE INVENTION

Figure 1:
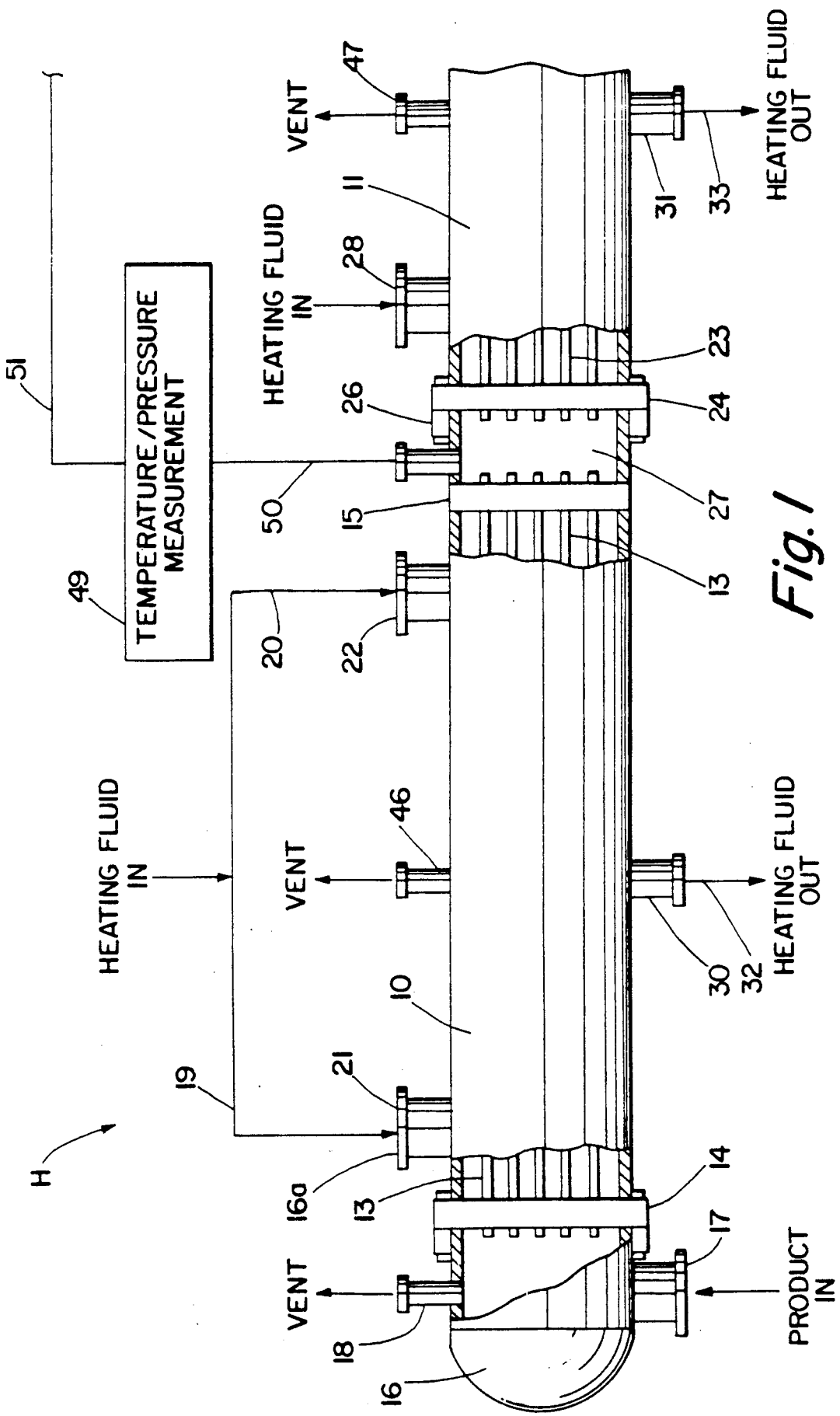
FIG. 1 is a front elevation view, partly in schematic, that illustrates an inlet section and the front half of a central section of the heat exchanger of this invention.
Figure 1A:
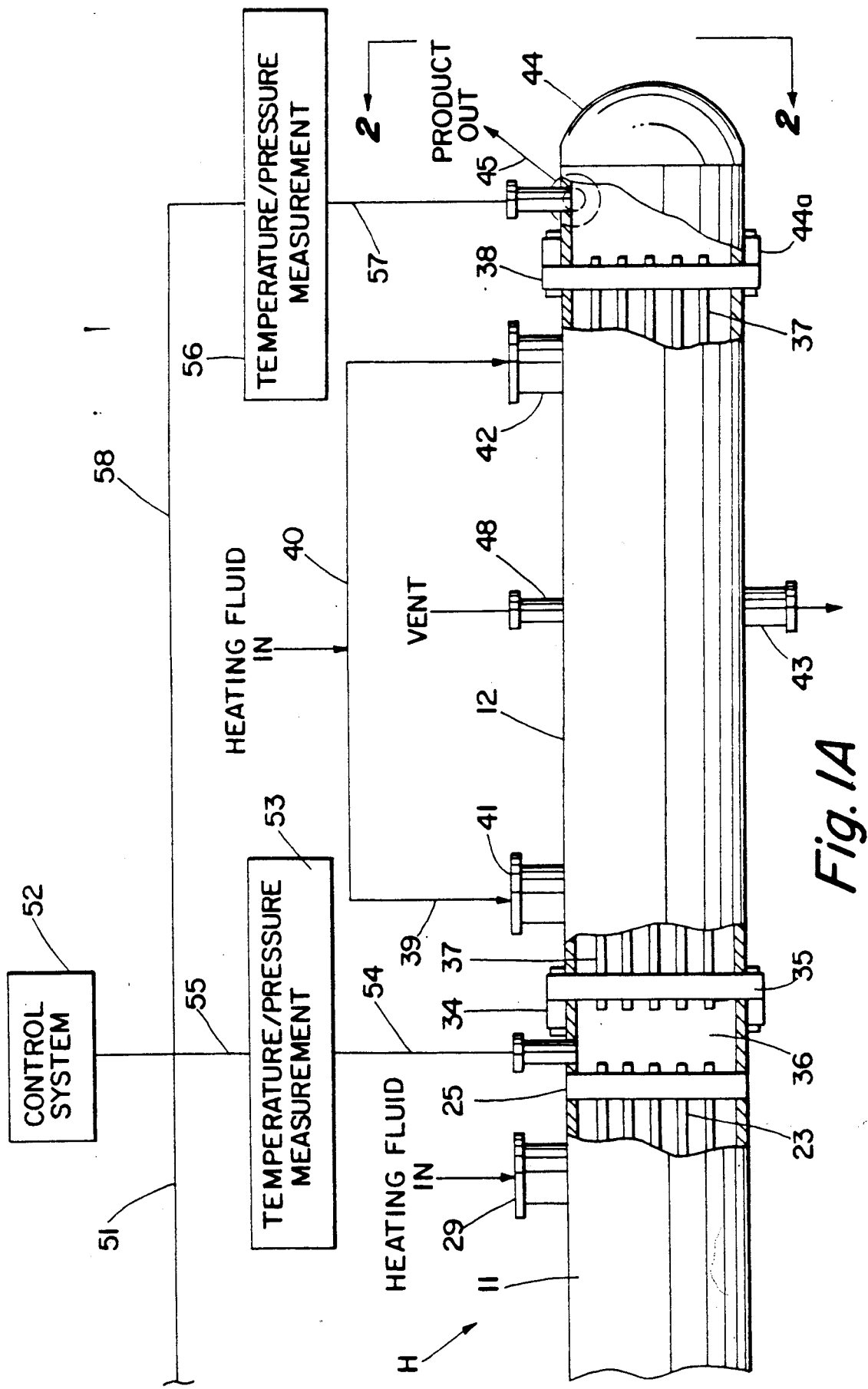
FIG. 1A is a front elevation view, partly in schematic, that illustrates the rear half of the central section, and an outlet section of the heat exchanger of this invention.

In the drawings, referring particularly to FIGS. 1 and 1A, the letter H indicates generally the heat exchanger of this invention. In the embodiment shown herein the heat exchanger is a shell and tube type unit comprising three sections: an inlet section 10, a central section 11, and an outlet section 12. Looking first at the inlet section 10, the shell member of this section encloses a tube bundle 13. The front end (entry end) of the tubes in bundle 13 are fastened into a tubesheet 14; and at the rear end (exit end) the tubes are fastened into a second tubesheet 15.

At the front end of the inlet section 10 is an inlet head member 16, which includes a flange 16a that fastens into the tubesheet 14. At the bottom of the head member is a product inlet nozzle 17, and a vent port 18 is installed at the top. Heating fluid is directed into the shellside of inlet section 10 through pipelines 19 and 20 that connect into inlet nozzles 21 and 22. The shell member of central section 11 encloses a tube bundle 23. The front end of the tubes in this bundle are fastened into a tubesheet 24, and the rear (exit) end of the tubes are fastened into a second tubesheet 25.

At the exit end of inlet section 10 is a flange 26 that fastens into the front tubesheet 24 of the central section 11. As shown in FIG. 1, the tubesheet 15 is set back, or recessed, from the exit end of inlet section 10. Recessing tubesheet 15 provides a chamber 27 between this tubesheet and tubesheet 24 in central section 11. Heating fluid is directed into the shellside of central section 11 through inlet nozzles 28 and 29. Discharge nozzles 30 and 31 are installed on the undersides of inlet section 10 and central section 11. These nozzles are connected into pipelines 32 and 33, which carry the heating fluid (in liquid form) to a furnace (not shown).

A flange 34 at the exit end of central section 11 fastens into the front tubesheet 35 of the outlet section 12. As shown in FIG. 1A, the tubesheet 25 in central section 11 is recessed from the exit end of this section, so that a chamber 36 is provided between the tubesheets 25 and 35. The shell member of outlet sections 12 encloses a tube bundle 37. The front end of the tubes in this bundle are fastened into the tubesheet 35, and the rear (exit) end of the tubes are fastened into a second tubesheet 38. Heating fluid is directed into the shellside of outlet section 12 through pipelines 39 and 40 that connect into inlet nozzles 41 and 42. The heating fluid leaves outlet section 12 through a discharge nozzle 43, and is carried back to the furnace mentioned earlier (but not shown).

At the exit end of section 12 is an outlet head member 44, which includes a flange 44a that fastens into the tubesheet 38. Head member 44 also includes a product outlet nozzle 45. A vent port 46 is installed on the top side of inlet section 10, and other vent ports 47 and 48 are installed in the top sides of central section 11 and outlet section 12. Several instruments for measuring the temperature and pressure of the product, as it moves through the heat exchanger H, are installed in chamber 27, chamber 36, and in the outlet head member 44.

Box 49 and lead 50 in FIG. 1 indicate the instruments in chamber 27, which are inserted into separate nozzles members (described below). The instruments are also connected by lead 51 into an electronic control system 52 (FIG. 1A). Box 53 and lead 54 in FIG. 1A indicate the instruments in chamber 36, which are inserted into another set of nozzle members (described below). These instruments are also connected by lead 55 into the control system 52. Box 56 and lead 57 indicate the instruments in head member 44, which are inserted into another set of nozzle members (described below). Lead 58 connects the instruments into the control system 52.

Figure 2:
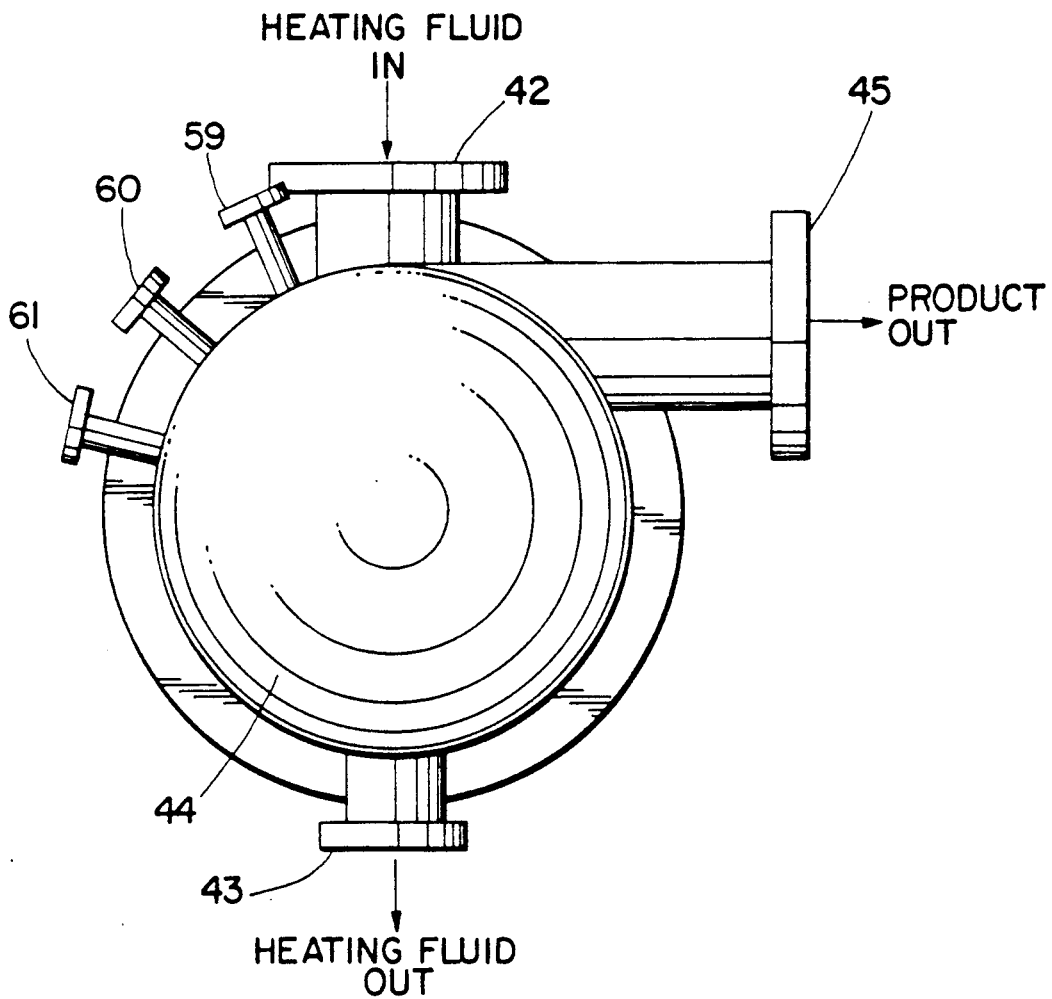
FIG. 2 is an end view, taken on line 2—2, of the heat exchanger sections illustrated in FIG. 1A.

The pressure exerted by the product is measured by a pressure transducer, and a pressure gage shows the actual reading. The temperature of the product is measured by a thermocouple. To simplify the drawing, the instruments positioned in chambers 27 and 36, and in head member 44, are not shown. But the nozzles that hold each instrument are illustrated in FIG. 2. For example, the pressure transducer fits into nozzle 59, the pressure gage in nozzle 60, and the thermocouple in nozzle 61.

OPERATION

The invention can be illustrated by describing a typical operation in which the heat exchanger of this invention is used in a process for making the linear low density polyethylene product mentioned earlier in this disclosure. In this process the viscous polymer solution that comes out of the reactor (not shown) is a mixture of the monomer, co-monomer and polymer phases, a catalyst, and a hydrocarbon solvent. This solution is then preheated to a temperature high enough to drive off (vaporize) the solvent and the unreacted monomer and co-monomer when the pressure is reduced in an appropriate manner. After the unreacted monomer, co-monomer, and a major portion of the hydrocarbon solvent has vaporized, the remaining solvent and molten polymer is pumped into a second devolatilizer vessel (not shown) to further concentrate the polymer phase.

The preheating operation is achieved by first passing the polyethylene (PE) solution through the heat exchanger H described herein. At the start of this operation, a heating fluid, in a vapor phase, is directed into the shellside of the inlet section 10 through pipelines 19 and 20, and inlet nozzles 21 and 22. The heating fluid used in this process is a commercially available heat transfer medium, which is sold under the name DOWTHERM ®. Other heat transfer fluids having properties similar to this product could be used in the practice of this invention. The heating fluid could also be a liquid product, depending on the product to be used.

The PE solution leaving the reactor (reactor effluent) enters the head member 16 of section 10 through the inlet nozzle 17. From the head member, the solution flows through the tubes in bundle 13, passes through chamber 27, and moves into the tubes of bundle 23 in the central section 11. As the solution moves through the inlet section 10, it is heated to a temperature of from about 220° C. to about 240° C. When the solution moves through the central section 11, it is heated further by heating fluid directed into section 11 through the inlet nozzles 28 and 29. The increase in temperature is from about 240° C. to about 250° C.

From the tubes in bundle 23 of central section 11, the PE solution passes through chamber 36 and into the tubes of bundle 37 in outlet section 12. As the solution moves through the outlet section, it is heated further by heating fluid directed into this section through pipelines 39 and 40 and inlet nozzle 41 and 42. The increase in temperature is from about 252° C. to about 270° C. From outlet section 12 the PE solution moves into the outlet head member 44, and is carried out the head member through the product outlet nozzle 45.

As described earlier, when the heating fluid moves through the inlet section 10, central section 11, and outlet section 12, it is condensed from a vapor phase to a liquid phase. From sections 10 and 11, the liquid phase passes through discharge nozzles 30 and 31 and pipelines 32 and 33, which carry it back through a furnace (not shown), where it is again vaporized. From outlet section 12, the liquid phase passes through the discharge nozzle 43 on its way back to the furnace.

When the PE solution moves through chamber 27, the temperature and pressure of the solution is monitored by the instruments represented by box 49 in FIG. 1 (a pressure transducer, pressure gage, and a thermocouple, as described above). Identical instrument groups are represented by boxes 53 and 56 (as explained earlier) and these instruments monitor the temperature and pressure of the PE solution as it moves through chamber 36, and through head member 44.

At each point where the temperature and pressure of the PE solution is monitored, the instruments send a signal to the control system 52. If the signal indicates that the temperature and pressure is below a set point that is programmed into the control system, it can indicate that the PE solution has become viscous enough to start plugging off the tubes in the section being monitored. If this happens, the control system will step up the flow of heating fluid into the affected section, which raises the temperature of the solution.

Sometimes, additional heating of the PE solution doesn't solve the plugging problem. When this happens, the plugged section of the heat exchanger can be uncoupled from the other sections and put into an oven for "baking out" the semi-hardened polymer material. In this procedure, the sections remaining are coupled together and connected into the reactor, so the preheating operation can be resumed. This allows the process train to continue operating, but at a reduced rate.

In the practice of this invention, the tubes used in the tube bundles of the heat exchanger should have a maximum inside diameter of ½ inch. If the tubes are larger than that the heat transfer of the exchanger is greatly reduced.

The invention claimed is:

1. A method for heating the reactor effluent of a polyethylene (PE) solution, and controlling the temperature of the solution, to thereby recover co-monomer and polymer phases of the solution, which comprises the steps of:
   assembling a single-pass, horizontal, shell and tube heat exchanger, which includes an inlet section, a central section and an outlet section;
   each section defining a tube bundle enclosed within a shell member;
   the inlet section including an inlet head member positioned ahead of the tube bundle, and the inlet section being joined to the central section, with a first chamber being defined between these sections;
   the central section being joined to the outlet section, with a second chamber being defined between these sections;
   the outlet section including an outlet head member positioned behind the tube bundle;
   the first chamber, second chamber, and outlet head member each having installed therein a means for measuring temperature and pressure inside the heat exchanger;
   the means for measuring temperature and pressure being connected into a control system;
   the inlet section, central section, and outlet section each having installed therein a means for directing a heating fluid into and out of each of these sections;
   directing the PE solution into the inlet head member, through a product inlet means in communication with the inlet head member;
   moving the PE solution through the tube bundles of the inlet section, the central section, and the outlet sections, and out the outlet head member at a pressure sufficient to keep the solution from vaporizing;
   passing a heating fluid through the shell member of the inlet section, to heat the PE solution to a first desired temperature level;
   measuring the pressure and temperature of the PE solution as it moves through the first chamber, and using the control means to maintain the temperature of said solution at said first desired level;
   moving the polyethylene solution through the tube bundle of the central section and the second chamber;
   passing a heating fluid through the shell member of the central section, to heat the PE solution to a second desired temperature level;
   measuring the pressure and temperature of the PE solution as it moves through the second chamber, and using the control means to maintain the temperature of said solution at said second desired level;
   moving the PE solution through the tube bundle of the outlet section and the outlet head member;
   passing a heating fluid through the shell member of the outlet section, to heat the polyethylene solution to a third desired temperature level;
   measuring the pressure and temperature of the polyethylene solution as it moves through the outlet head member, and using the control means to maintain the temperature of said solution at said third desired level;
   moving the polyethylene solution, as a mixture of the monomer, co-monomer, hydrocarbon solvent and polymer phases, out of the outlet head member into a product outlet means in communication with the outlet head member; and thereafter reducing the pressure sufficiently to vaporize unreacted monomer and solvent in said solution.

2. The method of claim 1 in which the PE solution is maintained at a temperature of from about 220° C. to about 240° C. as it moves through the inlet section of the heat exchanger.

3. The method of claim 1 in which the PE solution is maintained at a temperature of from about 240° C. to about 250° C. as it moves through the central section of the heat exchanger.

4. The method of claim 1 in which the PE solution is maintained at a temperature of from about 250° C. to about 270° C. as it moves through the outlet section of the heat exchanger.

* * * * *